United States Patent

Massengeil

[11] 4,080,067
[45] Mar. 21, 1978

[54] COPYING MACHINE
[75] Inventor: Hans A. Massengeil, Munich, Germany
[73] Assignee: AGFA-Gevaert, A.G., Leverkusen, Germany
[21] Appl. No.: 742,887
[22] Filed: Nov. 18, 1976
[30] Foreign Application Priority Data
Nov. 28, 1975 Germany .................. 2553665
[51] Int. Cl.² .................. G03G 15/00; G03B 27/54
[52] U.S. Cl. .................................... 355/67; 355/11
[58] Field of Search .................. 355/3 R, 8, 11, 66, 355/47–51, 67, 69, 70, 71, 77

[56] References Cited
U.S. PATENT DOCUMENTS
3,981,577  9/1976  Tsilibes .................. 355/71 X FOREIGN PATENT DOCUMENTS
1,450,987  10/1965  France .................. 355/11
422,456  6/1947  Italy .................. 355/48

Primary Examiner—Donald A. Griffin
Attorney, Agent, or Firm—Peter K. Kontler

[57] ABSTRACT

A copying machine wherein successive strip-shaped portions of an original are imaged onto a moving photosensitive carrier by a system which is mounted in part on a reciprocable carriage and includes one or more incandescent or fluorescent lamps and a mask having an elongated aperture through which light issuing from the lamp or lamps and impinging upon successive strip-shaped portions of the original passes to the photosensitive carrier. The mask can be installed in the path of modulated light between the lamp or lamps and the original or between the original and the carrier. The longer sides of the aperture are flanked by crenellated marginal portions of the mask so that the aperture is subdivided into a plurality of elongated neighboring sections which extend in the direction of movement of the carriage. The lens of the imaging system images the neighboring sections of the aperture onto the carrier in such a way that the images overlap, at least in part. This prevents the development (or reduces the sharpness) of ripples which normally develop on the copy as a result of unequal illumination of successive strip-shaped portions of the original, primarily because the intensity of light varies owing to the fact that the lamp or lamps are in circuit with a source of alternating current.

11 Claims, 6 Drawing Figures

COPYING MACHINE

CROSS-REFERENCE TO RELATED APPLICATION

The copying machine of the present invention is related to the machine which is disclosed in my commonly owned copending application Ser. No. 704,370 filed Nov. 10, 1976 and entitled "Optical Copying Machine".

BACKGROUND OF THE INVENTION

The present invention relates to optical copying machines in general, and more particularly to improvements in copying machines wherein the imaging system moves relative to the support for an original, or vice versa, and includes means for exposing successive strip-shaped portions of the original to modulated light in order to image such portions onto a photosensitive carrier, e.g., a web of photographic paper. The exposing means of the imaging system includes a mask or diaphragm which shields the remainder of the original from copying light.

When the imaging system of a copying machine includes one or more light sources (e.g., fluorescent lamps) which are in circuit with a source of alternating current, the intensity of copying light varies at a certain frequency whereby the reproduced image and its background often exhibit alternating rib- or strip-shaped regions (known as ripples or streaks) of more and less pronounced density which extend at right angles to the direction of movement and all the way between the marginal portions of the illuminated area of the carrier. Such undesirable formations are invariably attributable to fluctuations in the intensity of modulated copying light; they are especially pronounced if the number of light modulations during travel of a given portion of the original with respect to the imaging system or vice versa is relatively small. The just described situation will arise when the intensity of copying light is high, when the sensitivity of the carrier is high, when the carrier is a relatively narrow web and/or when the speed of the original with respect to the imaging system or vice versa is high.

It has been found that the development of ripples is attributable to rather pronounced differences between total amounts of light which impinge upon successive portions of the original during movement of the original relative to the imaging system or vice versa. In other words, and depending on the phase of the imaging system at the start of exposure of a given portion of the original to copying light, the timing of starting and final impulses of the imaging system is not identical for different portions or strips of the original.

My copending application Ser. No. 740,370 discloses an optical copying machine wherein the likelihood of the development of ripples on the copies of originals is reduced by selecting the width of successively illuminated strip-shaped portions of the original in such a way that the width is a whole multiple of the quotient of the speed of movement of the original with respect to the imaging system (or vice versa) and the modulation frequency of copying light. This insures that the amounts of light which impinge upon successive strip-shaped portions are always the same, independently of the phase of the imaging system at the start of illumination of a strip-shaped portion. However, the condition that the width of each strip-shaped portion of the original be a whole multiple of the aforementioned quotient can be met only if the relative speed between the original and the imaging system is constant or fluctuates within an extremely narrow range. It must be borne in mind that, if the gradation of the photosensitive carrier is steep, the copy will exhibit readily discernible ripples even if the amount of copying light fluctuates by less than 5 percent. Moreover, and since the intensity of light issuing from an elongated light source (e.g., a tubular fluorescent lamp) decrease from the center toward both ends, it is customary to use a diaphragm or mask with an elongated aperture whose width increases from the center toward both ends so as to compensate for the aforementioned characteristic of light sources. The aperture extends transversely of the original and determines the width of those strip-shaped portions of the original which are illuminated when the original moves relative to the mask and light source or vice versa. The fact that the width of the aperture increases from the center toward both ends affects the configuration of successively illuminated strip-shaped portions of the original. Deviations between the ideal configuration of such strip-shaped portions and the actual configuration (due to varying width of the aperture) are often so pronounced that the copy of the original exhibits streaks or ripples each of which varies in width as considered at right angles to the direction of movement of the carrier. Each ripple may but need not consist of two discrete halves which are disposed at the opposite sides of the central longitudinal symmetry plane of the carrier. In the case that each ripple consists of two substantially mirror symmetrical halves, one of the halves increases and decreases in width in a direction parallel to the longitudinal extension of the ripples. Such ripples of varying width develop when the width of the aperture of the mask decreases in directions from both ends toward the center of the aperture. The frequency of increase and decrease of the width of the ripples in the direction longitudinal to the respective ripple increases with increasing rate at which the width of the aperture increases from the center toward both ends thereof.

As a rule, each ripple extends across the entire width of the illuminated area. If the width of the aperture is constant, the width of the ripples is also constant. In each instance, the ripples are equally spaced apart from each other in the direction of movement of the carrier.

OBJECTS AND SUMMARY OF THE INVENTION

An object of the invention is to provide a novel and improved copying machine wherein the reproduction of an original is not likely to exhibit pronounced and relatively long ripples of different density in spite of the fact that the intensity of modulated copying light varies or is likely to vary during exposure of an original.

Another object of the invention is to provide a novel and improved mask or diaphragm for use in the above outlined copying machine.

A further object of the invention is to provide a novel and improved copying machine of the type wherein the original moves relative to the imaging system, or vice versa, to effect the exposure of successive narrow strip-shaped portions of the original to copying light.

An additional object of the invention is to provide the copying machine with novel and improved means which compensates for the fact that the intensity of copying light which issues from one or more elongated light sources varies in the longitudinal direction of such source.

The invention is embodied in an optical copying machine wherein an original, e.g., a sheet, is imaged onto a photosensitive carrier, such as a web of photographic paper. The machine comprises an imaging system including a source of modulated light (e.g., one or more elongated fluorescent lamps in circuit with a source of alternating current) and a mask or diaphragm having an elongated aperture through which light issuing from the source and impinging upon the original passes to the photosensitive carrier, and means for effecting relative movement between the original and the photosensitive carrier and the imaging system so that light passing through the aperture of the mask impinges upon successive strip-shaped portions of the photosensitive carrier. In accordance with a feature of the invention, the mask comprises preferably crenellated marginal portions which flank the longer sides of the aperture and subdivide the aperture into a plurality of elongated neighboring sections at least some of which are staggered with respect to each other, as considered in the direction of relative movement between the original and the light source and mask of the imaging system. The length of each section determines the width of the corresponding regions of the illuminated strip-shaped portions of the original.

The imaging system further comprises a lens which images the sections onto the carrier, and the distance between the planes of the mask and the original is preferably such that the images of neighboring sections of the aperture overlap each other (at least in part) on the carrier.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
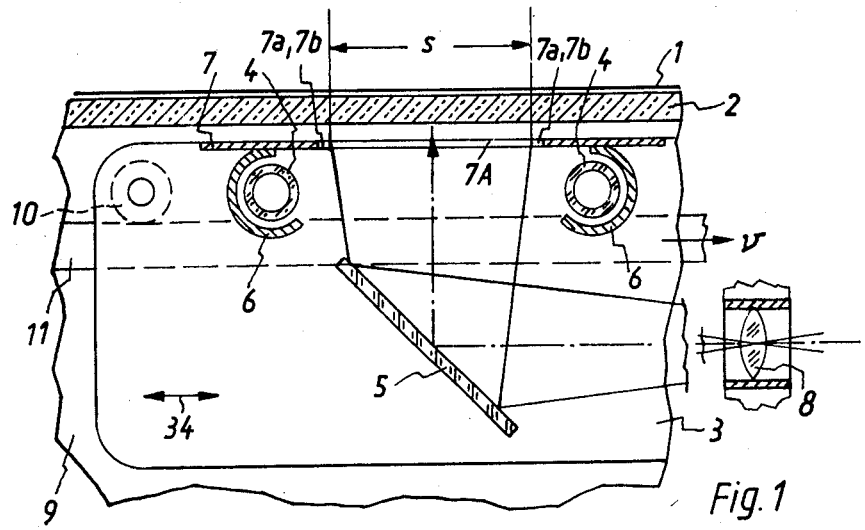
FIG. 1 is a fragmentary longitudinal sectional view of a copying machine which embodies the invention.

FIG. 1 illustrates a portion of a copying machine for imaging successive portions or strips of an original 1 onto a moving photosensitive carrier, not shown. The sheet-like original 1 rests on a stationary light-transmitting support or copyboard 2. The copyboard 2 is mounted in or on a housing or frame 9 which includes one or more rails 11 for the wheels 10 of a reciprocable carriage 3 constituting a mobile holder for certain elements of the optical imaging system. The imaging system includes a lens 8 which is installed in the frame 9, an opaque diaphragm or mask 7 which is movable with the carriage 3 and defines an elongated slit-shaped aperture 7A extending transversely of the direction of movement (arrow 34) of the carriage 3, a suitably inclined mirror 5 which is movable with the carriage 3 and reflects light toward the lens 8, two light sources 4, and two associated reflectors 6 which are rigid with and adjacent to the mask 7 at the opposite sides of the aperture 7A. The carrier may constitute a web of photographic paper one side of which is coated with a suitable emulsion and which is paid out by a supply reel and collected by a takeup reel in a manner well known from the art of copying machines. During imaging of successive strip-shaped portions of the original 1 onto the carrier, and carriage 3 travels at a speed $v$. The light sources 4 are assumed to constitute tubular fluorescent lamps which are parallel to the central symmetry plane of the aperture 7A, i.e., normal to the direction of movement of the carriage 3 and carrier. The longer sides of the aperture 7A are flanked by crenellated marginal portions of the mask 7, such marginal portions including alternating projections or teeth 7a and recesses or notches 7b.

It is clear that the elements 4–7 of the imaging system can be fixedly mounted in the frame 9 if the copyboard 2 for the original 1 is movable relative to the mask 7 and lens 8. Furthermore, the fluorescent lamps 4 can be replaced with incandescent lamps or other suitable light sources without departing from the spirit of the invention. Moreover, the mask 7 can be installed close to the plane of the carrier rather than in close proximity to the plane of the original 1 (as shown in FIG. 1), as long as modulated light issuing from the light source and impinging upon the original passes through the aperture 7A on its way from the light source to the photosensitive carrier.

Optical copying machines (including, among others, photocopiers, electrostatic copiers and microfilm copiers) normally (and almost invariably) utilize lamps which are in circuit with a source of alternating current. In such copying machines, the intensity of light varies at twice the frequency ($f$) of alternating current (as a rule, $f$ equals 50–60 cycles per second). Thus, the modulation frequency of light (which is produced by each half wave above as well as by each half wave below the time axis) equals $2f$.

Figure 2:
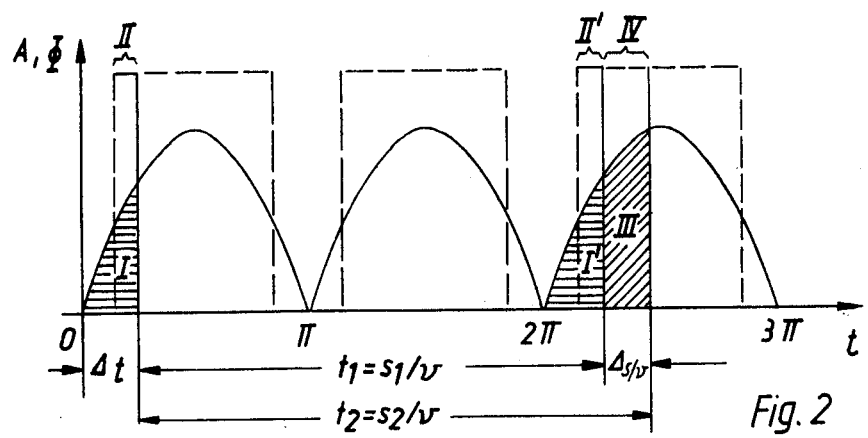
FIG. 2 is a diagram showing the relationship between the speed of the original relative to the imaging system (or vice versa) and the illumination of successive portions of the original.

FIG. 2 shows the relationship between the amplitude $A$ of alternating current and the intensity $\Phi$ (phi) of light as a function of time $t$. It is assumed that the intensity $\Phi$ is exactly or nearly proportional to the amplitude $A$; this normally applies for customary incandescent lamps. If the mask 7 is moved along the original 1 at a speed $v$, each unit area of the original is exposed to light for an interval $$t_D = s/v. \tag{I}$$

The duration $t_H$ of a half wave of the alternating current can be expressed as follows:

$$t_H = 1/2f = \pi. \tag{II}$$

FIG. 2 shows that $t_D$ is the same for each and every exposed unit area of the original (independently of the exact starting time of illumination) if the overall time (e.g., $t_1$) for illumination of each unit area is a whole multiple of $t_H$ (i.e., a whole multiple of the duration of a half wave). Thus, and assuming that $t_1 = s_1/v$, the exposure of a unit area of the original 1 to light which passes through the aperture 7A and is thereupon reflected by the mirror 5 need not begin at $t = 0$, as long as $t_1$ is a whole multiple of $t_H$. The illustrated interval $t_1$ begins with a delay $\Delta t$ after $t = 0$ so that it embraces a portion of the first half wave of FIG. 2, the entire second half wave, and a portion I' of the third half wave. The portion I' equals I which latter is the non-embraced portion of the first half wave. It is immaterial whether the portion I constitutes a minor or a major portion or fraction of the first half wave, as long as I equals I'. In other words, $t_D$ must equal $n$ times $t_H$ wherein $n$ is a whole number. The width $s$ of each unit area of the original 1 can be calculated by dividing $t_D$ with $t_H$, i.e.:

$$s = n \cdot v/2f \qquad (III)$$

If $t_D = t_2 = s_2/v$, wherein $t_2 = t_1 + \Delta s/v$ (see FIG. 2), i.e., wherein $t_2$ is not a whole multiple of $t_H$, the illumination of a unit area of the original 1 is not uniform because the embraced portion (I' + III) of the third half wave exceeds the non-embraced portion (I) of the first half wave. This can happen if $t$ is too long and/or if the width $s$ of the unit area of the original 1 does not satisfy the equation (III) above. It will be readily seen that the value or area of III in FIG. 2 depends to a large extent on the value of $\Delta t$. The maximum value of III is reached if it is halved by an ordinate which divides a half wave, i.e., if the two halves of III are mirror symmetrical to a phase $n.\pi/2$. The minimum value of the area III is reached when the two halves of this area are mirror symmetrical to a phase $n.\pi$. Otherwise stated, the maximum and minimum areas of III are spaced from each other by $t = \frac{1}{4}f$, as considered in the direction of the time axis, which equals the distance (v.t) covered by the light passing through aperture 7A and along the original 1 during such interval of time. It can be said that the portion ($s_V$) of $s$ which corresponds to a quarter wave is:

$$s_V = v/4f \qquad (IV)$$

Analogous relationships will develop if the variation of light intensity $\Phi$ deviates from the amplitude A of alternating current. This is shown in FIG. 2 by broken lines. The aforediscussed sinusoidal curve (shown by solid lines) represents variations of the intensity of light which is supplied by one or more incandescent lamps. The broken-line curve represents variations of intensity of light which is furnished by a different light source, e.g., one or more fluorescent lamps. The intensity $\Phi$ rises abruptly from zero to a maximum value and abruptly decreases to zero at a locus close to the frequency 2f. The intensity rises from zero to a maximum value when the current or voltage reaches a predetermined threshold value and vice versa. Actually, the intensity of light which is furnished by one or more fluorescent lamps does not always vary in exact accordance with the broken-line curve of FIG. 2; the sections or half waves of the curve are normally trapezoids or triangles. However, the basic requirement for uniform illumination of successive unit areas of the original 1 remains the same, i.e., the area II must equal the area II'. In other words, if the illumination begins at $\Delta t$, it must end at $t_1 = s_1/v$. Here, too, $t = s/v$ must equal $n$ times $t_H$ wherein $t_H$ is the duration of a half wave and $n$ is a whole number. If the illumination of a selected portion of the original 1 begins at $\Delta t$ and ends at $t_2 = s_2/v$, the area of IV is not compensated for and the reproduced image as well as its background will exhibit discernible ripples extending across the entire reproduction of the original.

It will be noted that, when the variations of $\Phi$ deviate from a sinusoidal curve, the differences in illumination of successive unit areas of the original are especially pronounced (note that the area IV in FIG. 2 greatly exceeds the area III). In most instances, the deviation can amount to 5-10 percent of the total amount of light which should reach the original in order to avoid the formation of ripples on the reproduction. This suffices to produce pronounced ripples, especially if the gradation of photosensitive carrier is steep. In the case of a carrier web having an average width, and further assuming that the web is advanced at an average speed and has average sensitivity, the interval of exposure of a unit length of the original to copying light normally equals 5-10$t_H$ whereby the maximum difference in illumination of successive unit lengths equals the major part of a half wave.

It has been found that the copy of an original will exhibit quite pronounced ripples when the width $s$ of successively illuminated strip-shaped portions of the original 1 deviates from the ideal width by as little as 5 percent. The same applies when the speed $v$ of relative movement between the original and the lamps 4 varies by 5 percent or even less. When the copying machine is in use, the aforementioned relative speed is not always constant; in fact, such speed is likely to fluctuate within a certain range which is wide enough to cause the development of ripples.

Figure 5:
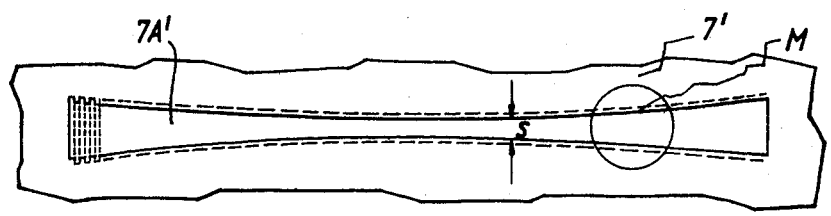
FIG. 5 is a plan view of the mask of FIG. 4.

In accordance with this invention, the development of ripples is prevented, or the copy of an original exhibits ripples of a character which is less bothersome to or not readily discernible by an observer, by appropriate selection of the configuration of the aperture 7A. The width of the aperture may be constant from one end to the other, or the width may increase from the center toward both ends. In each instance, the improved configuration of marginal portions flanking the longer sides of the aperture insures that the copy does not exhibit any ripples (or that the copy exhibits ripples which are not readily discernible) even if the speed $v$ fluctuates by as much as 5 percent and/or if another parameter which can promote the development of ripples fluctuates within such range when the copying machine is in use. The improved configuration of marginal portions of the mask is of particular importance when the width of the aperture increases from the center toward both ends of the aperture in a manner as shown in FIG. 5. Such configuration of the aperture is often desirable in order to compensate for variations in intensity of light which is furnished by an imaging system, especially for the unavoidable reduction of intensity in the directions from the center toward both ends of an elongated light source (such as a fluorescent lamp).

Figure 3:
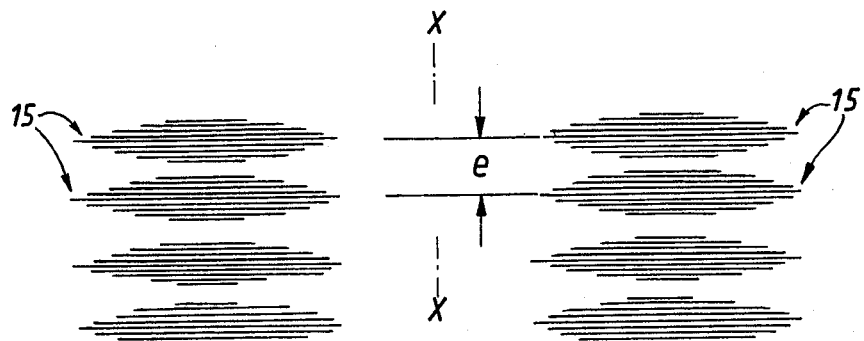
FIG. 3 illustrates the distribution of ripples of greater and lesser density on the carrier when the imaging system employs a conventional mask.

When a copying machine employs a conventional mask wherein the width of the aperture varies gradually and continuously from the center toward both ends, the illuminated strip-shaped portion of an original includes several areas whose width fully satisfies the equation (III) as well as a large number of areas whose width is not a whole multiple of $v/2f$. Consequently, the quantity of light which impinges upon a strip-shaped portion varies considerably, as seen in the longitudinal direction of the aperture, and only certain areas of each strip-shaped portion receive optimum quantities of light. This results in the formation of ripples 15 of the type shown in FIG. 3. The ripples 15 of FIG. 3 form two rows which are disposed at the opposite sides of the central longitudinal symmetry plane X—X of the copy carrier. Each ripple has a first half whose width increases in a direction away from the respective marginal portion of the copy carrier and a second half whose width decreases in a direction toward the plane X—X. The distance $e$ between the longest portions of two neighboring ripples 15 in the same row equals $v/2f$, the same as when the ripples extend across the full width of the copy carrier.

The ripples 15 need not consist of discrete halves which are mirror symmetrical to each other with reference to the plane X—X. Thus, each ripple 15 may extend all the way across the full width of illuminated area of the photosensitive carrier and merely exhibits a narrower portion in the region of the plane X—X. The frequency of ripples 15 increases with increasing rate at which the width of the aperture in a conventional mask increases from the center toward both ends thereof.

If the width of the aperture is constant, the carrier exhibits equally spaced ripples of constant width, except if the width of successively illuminated strip-shaped portions of the original is selected in a manner as disclosed in my aforementioned copending application Ser. No. 740,370 filed Nov. 10, 1976.

Figure 6:
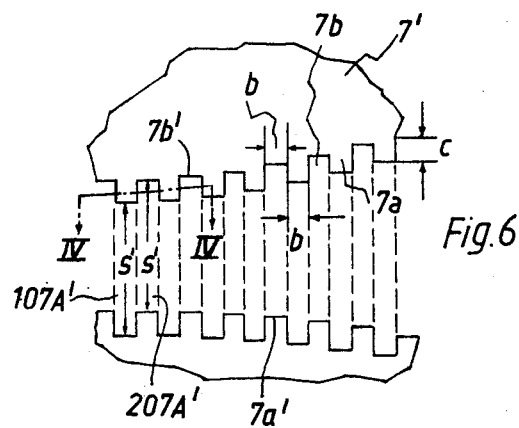
FIG. 6 is an enlarged view of a detail within the circle M of FIG. 5.

FIG. 6 shows a portion of a diaphragm or mask 7' having an elongated aperture 7A' with a configuration as shown in FIG. 5. The width of the aperture 7A' increases gradually from the center toward both ends in order to compensate for the aforediscussed characteristic of fluorescent lamps or analogous light sources. Each of the two marginal portions which flank the longer sides of the aperture 7A' is castellated or crenellated, i.e., it is formed with alternating recesses or notches 7b and projections or teeth 7a. The width $b$ of each projection 7a equals the width of the notches 7b. The depth $c$ of each notch 7b equals $v/4f$. The notches 7b of one marginal portion are in exact register with the projections 7a of the other marginal portion, and vice versa. Consequently, the width $a'$ of an elongated section of the aperture 7A' between the bottom surface 7b' of a notch 7b in one marginal portion and the top surface or land 7a' on the registering projection 7a of the other marginal portion is almost the same as the width of the neighboring sections, especially at the center of the aperture 7A' where the width of the aperture varies very little or not at all. The difference in width of neighboring sections is more pronounced at both ends of the aperture 7A'.

Figure 4:
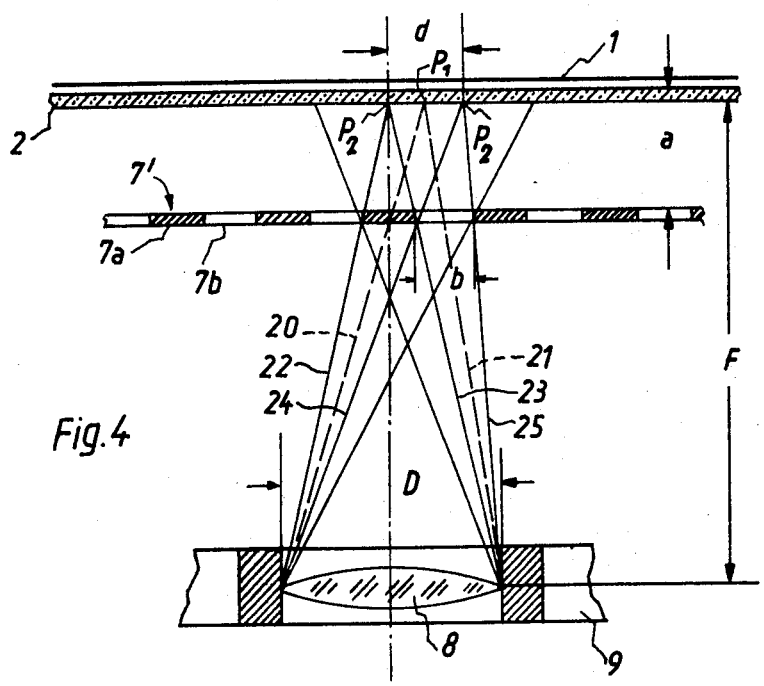
FIG. 4 is an enlarged sectional view of a detail of a copying machine having a modified mask.

FIG. 4 shows the relationship between the distance $a$ of the plane of the mask 7' from the plane of the original 1 and the width $b$ of projections 7a and notches 7b. The relationship is such that the somewhat blurred images of projections 7a and notches 7b at least partially overlap each other. The two central projections 7a of FIG. 4 correspond to those which are intersected by the line IV—IV of FIG. 6. The ratio $a/b$ corresponds, at least substantially, to the ratio F/D wherein F is the focal length of the lens 8 and D is the effective diameter of the lens. Thus, the ratio $a/b$ should equal or approximate the resolving power of the lens. This insures a satisfactory overlapping of the effect of projections 7a and notches 7b.

The distance $d$ (shown in FIG. 4) should at least equal $b$. This distance equals the width of the light beam which has passed through a notch 7b and impinges upon the underside of the original 1 on the copyboard 2. Such selection of $d$ insures that the illumination of each region of each strip-shaped portion of the original 1 is influenced by at least two elongated sections of the aperture 7A' having different phases. It will be noted that, in FIG. 4, only the point $P_1$ of the image-bearing side of the original 1 is imaged to the same extent by two neighboring sections of the aperture 7A'. This is indicated by that bundle of light rays which is flanked by broken lines 20, 21. Thus, 50 percent of the point $P_1$ is imaged by the section 107A' (see FIG. 6) and the other 50 percent of such point is imaged by the section 207A'. When the imaging system is focussed upon one of the outermost points $P_2$ within the distance $d$, one of the points $P_2$ is imaged solely by the section 107A' and the other point $P_2$ is imaged solely by the section 207A'. This is indicated by the light ray bundles between the solid lines 22, 23 and 24, 25. For all points between the left-hand point $P_2$ and $P_1$ or $P_1$ and the right-hand point $P_2$, the ratio of imaging by the mixture of light passing through sections 107A', 207A' increases from the point $P_1$ toward either of the points $P_2$.

The two lines including the points $P_2$ of FIG. 4 on successive strip-shaped portions of the original 1 will or might produce ripples on the reproduction of the respective original. However, and since the width of such lines is negligible (each line includes the corresponding successive points $P_2$ and the immediate vicinity of such points where the extent to which light passing through the section 107A' overlaps light passing through the section 207A' to a rather small degree), the ripples on the reproduction are not pronounced and, in fact, hardly noticeable. Such ripples can be eliminated in their entirety if the distance $a$ between the image-bearing side of the original 1 and the mask 7' is increased so that the ratio $a/b$ does not equal or approximate the ratio F/D.

In each instance, the novel configuration of the marginal portions of the mask 7 (having an aperture 7A of substantially constant width) or the mask 7' (with an aperture 7A' whose width increases toward both ends) insures that the rippling of reproductions or copies is much less pronounced than that of copies which are produced in copying machines having masks with apertures bounded by non-crenellated marginal portions. Such crenellated marginal portions divide the aperture 7A or 7A' into a plurality of narrow neighboring sections (such as the sections 107A', 207A' of FIG. 6) which are elongated in the direction of relative movement between the original and the imaging system. The length of each section of the aperture corresponds to the necessary width of the corresponding portion of the aperture. As mentioned above, the average width of the aperture (7A) may be constant, or the width varies (see the aperture 7A') from the center toward both ends of the aperture to compensate for the aforediscussed variations in brightness of light issuing from an elongated fluorescent lamp or the like. If the copy still exhibits some ripples, the ripples are invariably less pronounced and form a checkerboard pattern which is much less bothersome to the eye of an observer than the pattern of FIG. 3 or a pattern of straight ripples which extend across the full width of the copy. The aforementioned checkerboard pattern consists of relatively small darker and lighter areas which will be discerned only by a very careful observer of the copy. The width of darker and lighter areas of the checkerboard pattern corresponds to the width b of projections 7a or notches 7b. It has been found that such fine checkerboard pattern is much less bothersome than the arrangement of ripples of the type shown in and described in connection with FIG. 3.

It has been found that the selection of the distance a in a manner as described in connection with FIG. 4 further reduces the likelihood of the formation of ripples (even the aforementioned checkerboard patterns). This is due to the fact that the somewhat blurred portions of images of neighboring sections of the aperture overlap each other in the plane of the carrier. It can be said that the arrangement of FIG. 4 causes an overlapping of the timely spaced effects of neighboring aperture sections. As mentioned above, the compensation is particularly effective if the extent to which the neighboring sections are staggered relative to each other equals $v/4f$ because the maximum and minimum values of the effect of staggering of neighboring sections are out of phase by $v/4f$. This insures that the effect of one of two neighboring sections deviates to one side and the effect of the other section diviates to the other side of the average value, i.e., the deviations balance each other and the amount of light reaching the carrier remains constant.

The likelihood of development of ripples is further reduced if the improved copying machine embodies the feature which is claimed in my copending application Ser. No. 740,370, i.e., that the width of the illuminated strip-shaped portion of the original satisfies the equation (III). Such selection of the width of strip-shaped portions of the original can be intentional or accidental.

If the average width of the aperture is constant (i.e., if the width does not increase toward the ends because the emission of light is constant along the full length of the lamp or lamps), the likelihood of rippling is even less pronounced because the length of each and every section of the aperture (7A) may be a whole multiple of $v/2f$. However, even if the ends of the aperture (7A') flare outwardly in a manner as shown in FIG. 5, the aforediscussed overlapping effect of neighboring sections 107A', 207A', etc. insures that the ripples do not develop at all or form a pattern which does not appreciably affect the quality of reproductions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In an optical copying machine wherein an original is imaged onto a photosensitive carrier, a combination comprising an imaging system including a source of modulated light and a mask having an elongated aperture through which light issuing from said source and impinging upon the original passes to the photosensitive carrier; and means for effecting a relative movement between the original and/or the photosensitive carrier and/or said system so that light passing through said aperture impinges upon successive strip-shaped portions of the photosensitive carrier, said mask comprising marginal portions bounding said aperture and subdividing the latter into a plurality of elongated neighboring sections at least some of which are staggered with respect to each other, as considered in the direction of said relative movement, one section of each pair of staggered neighboring sections extending forwardly beyond the other section and the other section extending rearwardly beyond the one section, as considered in said direction.

2. A combination as defined in claim 1, wherein the length of said sections determines the width of the corresponding regions of said strip-shaped portions.

3. A combination as defined in claim 1, wherein said system further comprises a lens which images said sections onto the carrier, said mask being located in a first plane and the original being located in a second plane which is at least substantially parallel to said first plane, the distance between said planes being such that the images of neighboring sections overlap each other, at least in part, on the carrier.

4. A combination as defined in claim 1, wherein said marginal portions of said mask are crenellated.

5. A combination as defined in claim 1, wherein the length of said sections increases in directions from the center toward both ends of said aperture.

6. In an optical copying machine wherein an original is imaged onto a photosensitive carrier, a combination comprising an imaging system including a source of modulated light and a mask having an elongated aperture through which light issuing from said source and impinging upon the original passes to the photosensitive carrier; and means for effecting a relative movement between the original and/or the photosensitive carrier and/or said system so that light passing through said aperture impinges upon successive strip-shaped portions of the photosensitive carrier, said mask comprising marginal portions bounding said aperture and subdividing the latter into a plurality of elongated neighboring sections at least some of which are staggered with respect to each other, as considered in the direction of said relative movement, the extent to which said sections are staggered with respect to each other being equal to $v/4f$ wherein $v$ is the speed of said relative movement and $f$ is the modulation frequency of light issuing from said source.

7. A combination as defined in claim 6, wherein all of said neighboring sections are staggered with respect to each other.

8. In an optical copying machine wherein an original is imaged onto a photosensitive carrier, a combination comprising an imaging system including a source of modulated light and a mask having an elongated aperture through which light issuing from said source and impinging upon the original passes to the photosensitive carrier; and means for effecting a relative movement between the original and/or the photosensitive carrier and/or said system so that light passing through said aperture impinges upon successive strip-shaped portions of the photosensitive carrier, said mask comprising crenellated marginal portions bounding said aperture and subdividing the latter into a plurality of elongated neighboring sections at least some of which are staggered with respect to each other, as considered in the direction of said relative movement, said marginal portions including alternating recesses and projections, the recesses of one of said marginal portions being in register with projections of the other marginal portion and vice versa.

9. A combination as defined in claim 8, wherein the depth of each of said recesses equals $v/4f$ wherein $v$ is the speed of said relative movement and $2f$ is the modulation frequency of light issuing from said source.

10. A combination as defined in claim 8, wherein the width of said recesses, as considered in the longitudinal direction of said aperture, equals the width of said projections.

11. In an optical copying machine wherein an original is imaged onto a photosensitive carrier, a combination comprising an imaging system including a source of modulated light and a mask having an elongated aperture through which modulated light issuing from said source and impinging upon the original passes to the photosensitive carrier; and means for effecting a relative movement between the original and/or the photosensitive carrier and/or said system so that light passing through said aperture impinges upon successive strip-shaped portions of the photosensitive carrier, said mask comprising marginal portions bounding said aperture and subdividing the latter into a plurality of neighboring sections at least some of which are staggered with respect to each other, as considered in the direction of said relative movement, the length of at least some of said sections being equal $n$ times $v/2f$ wherein $n$ is a whole number, $v$ is the speed of said movement and $2f$ is the modulation frequency of light issuing from said source.

* * * * *